W. A. MARTIN AND M. P. ROEBUCK.
COTTON CHOPPER ATTACHMENT FOR CULTIVATORS.
APPLICATION FILED OCT. 31, 1919.
1,347,646.
Patented July 27, 1920.
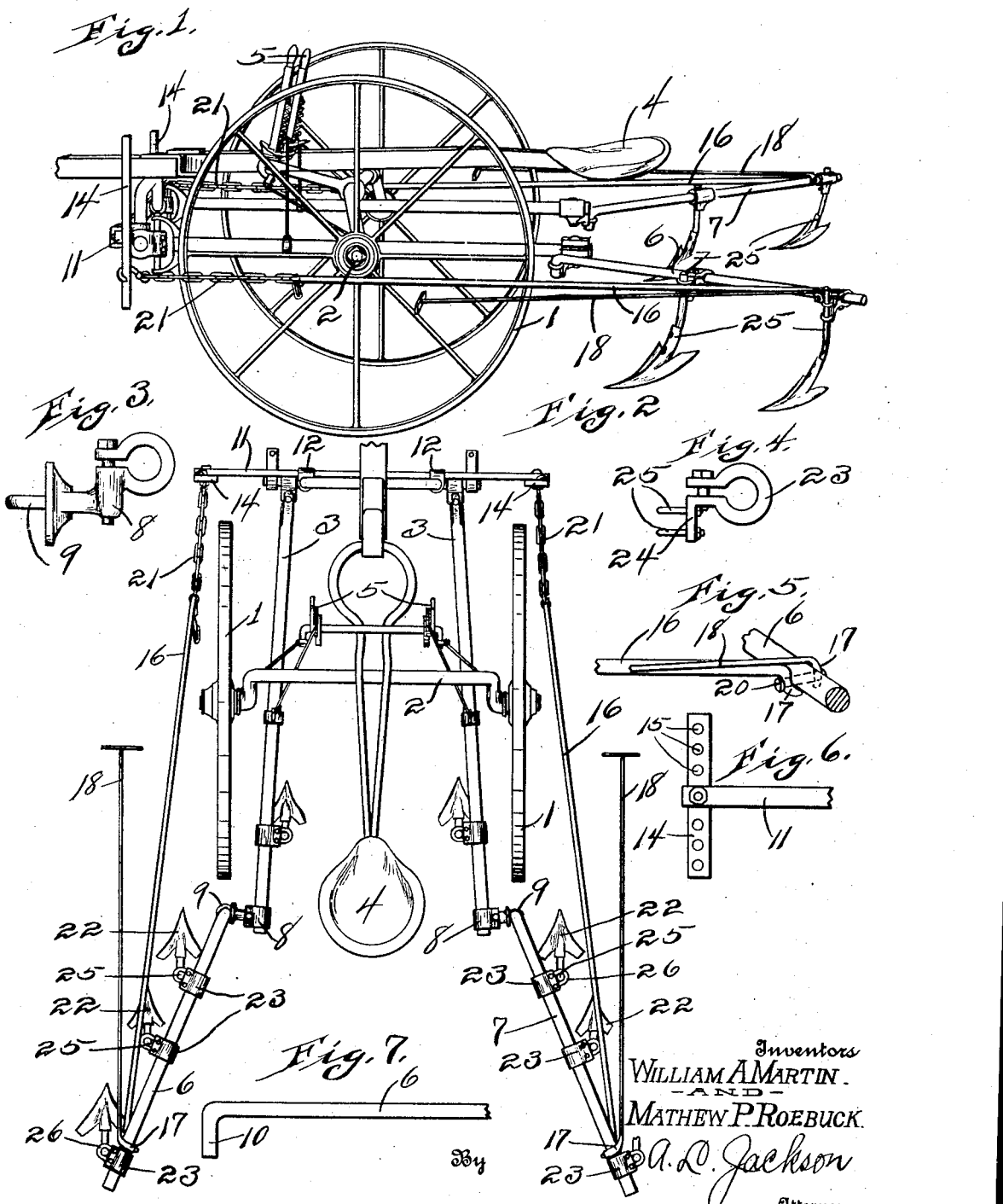

UNITED STATES PATENT OFFICE.

WILLIAM A. MARTIN AND MATHEW P. ROEBUCK, OF WAXAHACHIE, TEXAS, ASSIGNORS OF ONE-THIRD TO GEO. E. WHITE, OF FORT WORTH, TEXAS.

COTTON-CHOPPER ATTACHMENT FOR CULTIVATORS.

1,347,646.     Specification of Letters Patent.     Patented July 27, 1920.

Application filed October 31, 1919. Serial No. 334,707.

*To all whom it may concern:*

Be it known that we, WILLIAM A. MARTIN and MATHEW P. ROEBUCK, both citizens of the United States of America, residing at Waxahachie, in the county of Ellis and State of Texas, have invented certain new and useful Improvements in Cotton-Chopper Attachments for Cultivators, of which the following is a specification.

Our invention relates to improvements in cultivators and more particularly to cotton chopping attachments for applying to cultivators, and the object is to provide certain simple attachments which will be relatively inexpensive and which can be easily and quickly attached to and detached from a cultivator of ordinary type and which will be highly useful in chopping and plowing cotton plants. The object is to equip a cultivator so that cotton may be chopped or blocked by simply plowing across the rows. Other objects and advantages will be fully explained in the following description and the invention will be more particularly pointed out in the claims.

Reference is had to the accompanying drawings which form a part of this application.

Figure 1 is a side elevation of a cultivator in part and the improvements applied thereto. Fig. 2 is a plan view of the same. Fig. 3 is a detail view of a cultivator clamp. Fig. 4 is a detail view of one of the clamps for attaching the cotton choppers or blockers. Fig. 5 is a detail view, showing the manner of attaching the adjusting rods and markers for regulating the cotton choppers. Fig. 6 is a detail view of the adjusting means at the front for regulating the depths which the cotton choppers make in the ground. Fig. 7 is a side elevation of one of the cotton chopper beams.

Similar characters of reference are used to indicate the same parts throughout the several views.

The drawings show a wheeled cultivator of ordinary type. The cultivator has wheels 1 which support an axle 2 and has the usual cultivator beams 3 pivotally connected to the forward part of the cultivator. The cultivator has the usual seat 4 located conveniently for operating the levers 5 which control the cultivator beams 3. All parts of the cultivator are of the usual types.

For chopping or blocking young cotton plants, a pair of beams 6 and 7 are pivotally connected to the cultivator beams 3 by means of clamps 8 which have clamping members for engaging the beams 3 and have sockets 9 to receive bent terminals 10 of the beams 6 and 7. The terminals 10 simply drop into the sockets 9 and the rear ends of the beams can be swung inwardly or outwardly for purposes hereinafter explained. The clamps 8 provide draft means for the beams 6 and 7. Additional draft means for the cotton choppers are provided. A bar or beam 11 is attached to the forward part of the cultivator by clamps 12. Upright adjusting bars 14 are attached to the ends of the bar 11 and these bars are provided with a plurality of openings 15. Rods 16 are attached to the rear ends of the beams 6 and 7. The ends 17 of the rods 16 bear against the ends of the beams 6 and 7 and cotton or row markers 18 are also attached to the ends of the beams 6 and 7 by bending the ends 17 over and behind the bars 6 and 7 near their ends so that one bolt 20 will attach both a marker and draft rod 16 to a beam 6 and to a beam 7. The forward ends of the rods 16 are attached to the adjusting bars 14 by chains 21 which may be caught in any of the openings 15 in the adjusting bars 14.

The plows 22 are attached to the beams 6 and 7 by clamps 23. The clamps 23 have supporting members 24 and the shanks 25 are placed against the supporting members 24 and clamped thereto by U-bolts 26. The markers are attached, as above stated to the beams 6 and 7. These markers are to run above the last furrow made by the cultivator across the field and so guide the operator in driving across the field.

With devices shown, the cotton choppers 22 are drawn by the beams 6 and 7 and the beams 6 and 7 are drawn by the beams 3 of the cultivator and by the draft rods 16 and chains 21. The choppers 22 may be made to run farther apart by taking up links in the chains 21 and may be made to run closer together by letting out links in the chains 21. The choppers 22 may be made to run deeper into the ground by connecting the chains 21 in openings 15 toward the lower ends of the adjusting bars 14 and may be made to run nearer the top of the ground by connecting the chains 21 in the openings nearer the top of the adjusting bars 14. The shanks of the plows 22 may be adjusted on the supports 24 by the U-bolts 26 to make the plows or choppers run at different depths.

What we claim is:—

1. Attachments for cultivators comprising supplemental beams pivotally connected at their front ends to the cultivator beams, a cross draft beam mounted on the forward part of the cultivator, adjustable connections connecting said cross beam and the rear ends of said supplemental beams, and plows mounted on said supplemental beams.

2. Attachments for cultivators comprising supplemental beams and clamps for pivotally connecting said beams at their front ends to the cultivator beams, a cross draft beam mounted on the forward part of the cultivator, rods connected at their rear ends to said supplemental beams and links connecting said rods to said draft beam, and plows mounted on said supplemental beams.

3. Attachments for cultivators comprising supplemental beams having bent terminals at their front ends, clamps attached to the cultivator beams and having vertical sockets to receive the bent terminals of said supplemental beams, a cross draft beam mounted on the forward part of the cultivator, adjusting rods connected at their rear ends to said supplemental beams and provided at their forward ends with links for engaging said cross draft beam, and plows attached to said supplemental beams.

4. Attachments for cultivators comprising supplemental beams and means for pivotally connecting said beams to the rear part of the cultivator, a cross draft beam mounted on the forward part of the cultivator, rods for lateral adjustment of said beams at their rear ends, vertically adjustable means for connecting the forward ends of said rods to said cross beam, and plows mounted on said supplemental beams.

5. Attachments for cultivators comprising supplemental beams and means for pivotally connecting the forward ends of said beams to the rear part of the cultivator, means mounted on the front part of the cultivator and connected to the rear ends of said beams for lateral adjustment of the rear ends of said beams, and plows carried by said beams for chopping and plowing cotton.

6. Attachments for cultivators comprising supplemental beams, means for pivotally connecting said beams to the cultivator beams, rods for lateral adjustment of the rear ends of said beams, a cross draft bar mounted on the forward part of the cultivator and provided with vertically adjusting bars, means connecting said rods to said adjusting bars, bolts attaching said rods to the rear ends of said supplemental beams, and plows mounted on said supplemental beams.

In testimony whereof we set our hands this 15th day of October, A. D. 1919.

WILLIAM A. MARTIN.
MATHEW P. ROEBUCK.